United States Patent [19]

Schiek

[11] 4,114,752
[45] Sep. 19, 1978

[54] ALL PURPOSE INDEXING DEVICE

[76] Inventor: Robert J. Schiek, 15 River Rd., Brunswick, Me. 04011

[21] Appl. No.: 766,873

[22] Filed: Feb. 9, 1977

[51] Int. Cl.² ............................................. B65G 47/22
[52] U.S. Cl. ...................................... 198/491; 53/67; 53/534; 198/424; 198/431; 198/432
[58] Field of Search .................... 53/67, 69, 70, 71, 74, 53/160, 246; 198/418, 424, 431, 432, 491

[56] References Cited

U.S. PATENT DOCUMENTS

| 2,750,899 | 6/1956 | Marasso | 53/160 X |
| 3,863,422 | 2/1975 | Wagner | 53/67 X |

Primary Examiner—Travis S. McGehee
Attorney, Agent, or Firm—Constantine A. Michalos

[57] ABSTRACT

An all purpose indexing device primarily for interrupting the motion of baking pans on a continuously moving conveyor, the baking pans having spaced indentations therein, comprising a U-shaped index bar pivotally mounted to fixed portion of the conveyor frame having a central crosspiece disposed across the conveyor, at least two indexing fingers extending downwardly from the crosspiece toward the conveyor and engagable with the indentations of a baking pan. Air cylinders are connected between the U-shaped index bar and the fixed portion of the conveyor frame at points adjacent respective lateral ends of the index bar. A sensing rod is pivotally mounted to the conveyor frame and disposed parallel to the index bar. A sensing finger is connected adjacent the middle of the sensing rod and extends downwardly towards the conveyor. A microswitch activating cam is connected to one end of the sensing rod and functions to activate the microswitch when the sensing finger is rotated away from the conveyor due to the action of a passing baking pan. An adjustable means is connected between the respective air cylinders and a fixed portion of the frame to allow for adjusting the spacing between the indexing fingers and the conveyor.

5 Claims, 8 Drawing Figures

ALL PURPOSE INDEXING DEVICE

BACKGROUND OF THE INVENTION

1. Field of the Invention

This invention relates generally to indexing devices for use on conveyors and more particularly to a new and useful all purpose indexing device for use in interrupting the motion of baking trays on continually moving conveyors.

2. Description of the Prior Art

Baking tray indexing devices have been known which interrupt the motion of a baking tray on a continuously moving conveyor that utilize a plurality of indexing fingers movably suspended over the conveyor and engagable with indentations in the baking trays. In the past, the motion of these indexing fingers has been realized by the use of parallel bars and linkages connected between the stationary conveyor frame and the movable indexing fingers. Disadvantages of this arrangement include breakage of the indexing fingers due to the rigidity of the structure in the direction of motion of the conveyors and a lack of adjustment in the vertical travel of the indexing fingers from an upper clear position, allowing the trays to travel undisturbed under the arrangement to a lower engaging position, to interrupt the motion of the baking trays.

Another disadvantage of this arrangement was the tendency of the linkages to jam in an "up" position which required the assistance of a mechanic to unjam the linkages and restart the dough-feeding process.

In addition, the arrangement afforded no vertical fine adjustment of the indexing fingers in the linkage frame. Problems of operation in the prior system arose after a successful indexing of a single pan. The uniform spacing of the indentations in one pan not being equal to the spacing between the last row of indentations of a pan to the first row of indentations of the succeeding pan on the conveyor led to the back-up and jamming of baking pans on the conveyor. Also, since the reciprocal vertical motion of the indexing fingers was timed to coincide with the spacing of the indentations, the possibility arose that the indexing fingers would be brought down upon a leading or trailing edge of a baking pan due to the non-uniformity of spacing at these locations. The motion of the conveyor in the prior art systems was continuous and no sensing means was incorporated in these systems to sense the beginning or end of a baking pan and thus avoid the above problem.

Other limitations of the prior art systems were that due to the nature of the indexing, baking pans having small and closely spaced indentations could not successfully be used therein. Also, the range of sizes and shapes of spacing and indentations in baking pans was severely limited by the lack of adjustment in the speed of the conveyor.

SUMMARY OF THE INVENTION

The present invention is an all purpose indexing device which is usable primarily in the loading of baking pans having spaced indentations therein with uniformly sized and molded pieces of dough being supplied from an overhead dough-supplying and chute means. The continuous motion of baking pans on a belt conveyor is selectively interrupted at time intervals to enable a proper dispensation of sized dough pieces into spaced rows of indentations in the baking trays. According to the invention, this interruption is achieved by the use of a substantially U-shaped indexing bar, pivotally mounted to the conveyor frame and reciprocally movable upwardly and downwardly by the use of lateral air cylinders connected between lateral ends of the indexing bar and a portion of the conveyor frame.

Adjustment means are also provided between the air cylinder and the conveyor frame comprising a lever connected to one end of the air cylinder and pivotally mounted to a fixed portion of the conveyor frame and having a screw adjustment connection at an opposite end of the level also engagable into a fixed portion of the conveyor frame for adjusting the upward and downward stroke of the indexing bar. Adjacent the middle of the indexing bar are connected two indexing fingers which extend downwardly toward the conveyor. Through the adjustment of the screw means, the indexing fingers are prevented from being pushed too deeply into the indentations of the passing baking pans and thus causing a lifting of opposite ends of the pan due to the warped condition of same used baking pans. This adjustment further can prevent the indexing fingers from hitting the bottom of a pan and causing the lifting of other parts of the pan off the conveyor.

In an alternative adjustment means arrangement, an adjustment shaft is mounted across the legs of the conveyor and have adjustment arms connected to the respective cylinders. A worm gear is mounted on one leg and engages an adjustment gear which is fixed to the adjacent end of the adjustment shaft. To adjust the height of the indexing bar, the worm gear is turned by its attached handwheel which rotates the shaft and through the adjustment arms moves each cylinder. An advantage of this arrangement is that the adjustment of both cylinders is made by a single operation on one side of the conveyor.

The indexing fingers are preferably made of high density polyethelene material and are mounted in a rigid indexing finger holder which, in turn, is fixed to the mid-section of the indexing bar. The indexing fingers are advantageously reversible in the indexing finger holder for uniformity of wear and easy replacement thereof.

The pivot point of the indexing bar is placed at a spaced location from the connection between the indexing bar and the air cylinders in order to realize a proper arc of motion in a direction up and away from the baking pans to properly clear the leading or trailing edges thereof.

A sensing rod is pivotally mounted parallel to the indexing bar and across the conveyor.

A sensing finger is fixed to the sensing rod adjacent its mid-portion and extending downwardly towards the conveyor.

A cam means is connected adjacent one end of the sensing rod and connects with the flag of a microswitch. The microswitch is connected to a two-position switching arrangement that is, in turn, connected to the drive motor of the conveyor.

In operation, as a trailing edge of a baking pan passes the sensing finger, the sensing finger is rotated upwardly which rotates the sensing rod and, through the cam means, actuates the microswitch to change the speed of the conveyor from a first slow feeding speed to a second faster tray-conveying speed. This enables the rapid transfer of a successive line of baking pans while the indexing fingers are adjacent the trailing edge of one pan and the leading edge of a successive pan. By increasing the speed in this location, the reciprocal motion of the indexing fingers due to the action of the air cylinders need not be altered to prevent a jamming or bringing of the index fingers onto a leading or trailing edge of the baking pan. A curved chute is disposed between the dough supplying means and a position in front of and above the indexing bar. The chute is adapted for guiding the sized dough pieces from the dough supplying means to the proper locations over the dough pans in order to drop into the indentations in the baking pans.

In accordance with the invention, quick connection means are connected between fixed portions of the conveyor frame and lateral sides of the chute in order to facilitate rapid engagement and disengagement of the conveyor chute for cleaning and changing.

An object of the present invention is to provide an indexing device which will not jam in normal operation.

Another object of the invention is to provide an indexing device that enables the variable speed of an otherwise continuous-speed conveyor for advancing baking trays in an area of the trailing edge of one baking tray and the advancing forward edge of the succeeding baking tray on the conveyor.

Another object of the present invention is to provide a vertical adjustment for positioning the index fingers while in the lowest point of their reciprocal motion in order to avoid the unfavorable movement of a warped or bent baking tray due to a too-deep thrust of the indexing fingers on the conveyor.

Another object of the invention is to provide and indexing device that utilizes easily removable and rotatable, high-density polyethelene indexing fingers.

A still further object of the invention is to provide an indexing device which can be used without indexing fingers for interrupting the motion of the trays on the conveyor, but with the exclusive use of the sensing bar and finger arrangement to vary the speed of the conveyor itself only as the trailing lip of a first tray adjacent the leading lip of a second tray passes under the sensing finger.

Another object of the present invention is to provide an indexing device which is simple in construction, rugged in design, and economical to manufacture.

The various features of novelty which characterize the invention are pointed out with particularity in the claims annexed and forming a part of this disclosure. For a better understanding of the invention and its operating advantages and specific objects obtained by its uses, reference should be made to the accompanying drawings and descriptive material in which there is illustrated a preferred embodiment of the invention.

DESCRIPTION OF THE PREFERRED EMBODIMENT

Figure 1:
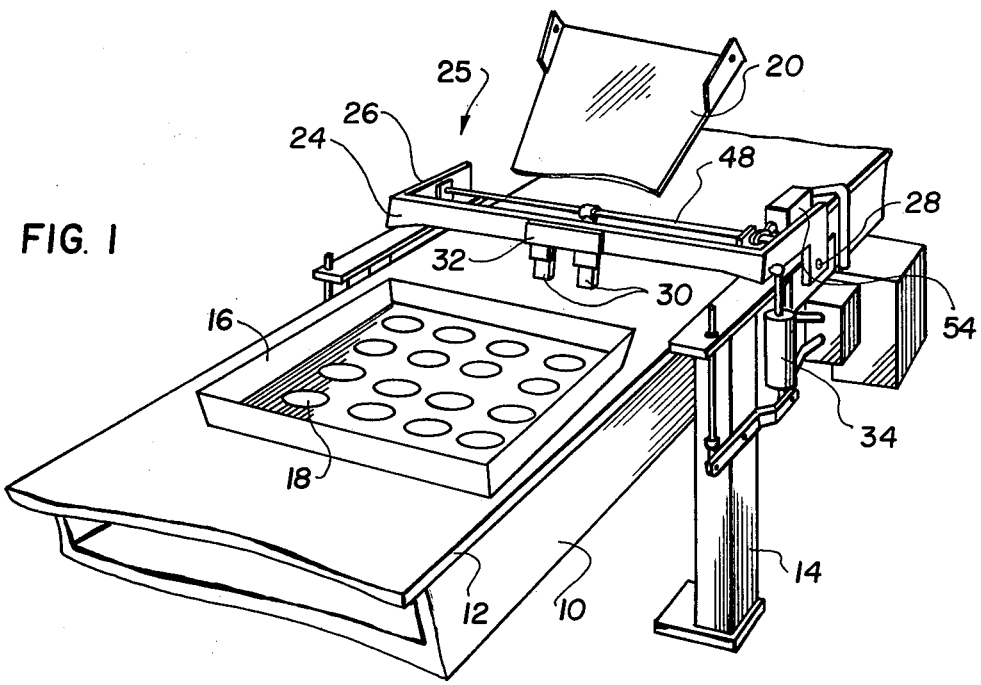
FIG. 1 is a sectional perspective view of the preferred embodiment of the invention.
Figure 3:
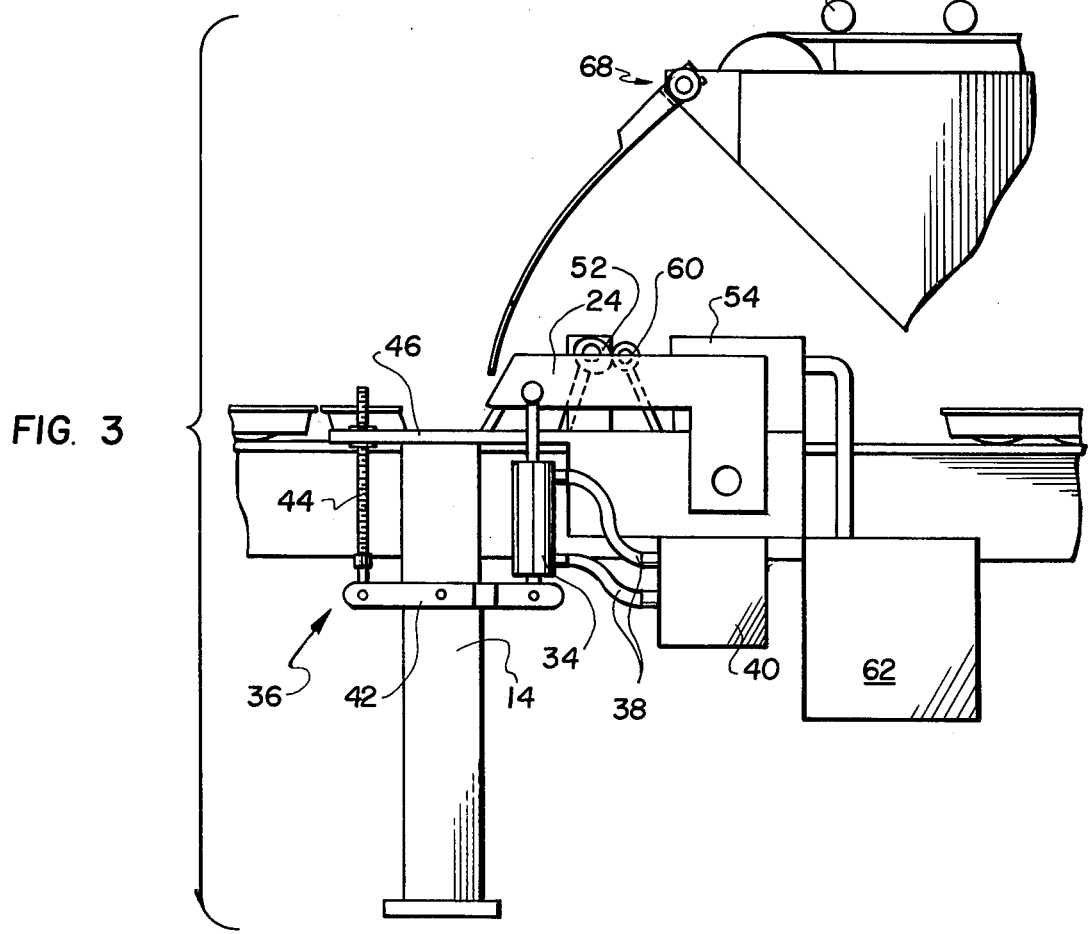
FIG. 3 is a side elevational view of the invention.

The invention disclosed herein comprises in FIG. 1 a conveyor 10 having a continually moving belt 12 and suspended by a conveyor frame 14. Riding on the belt 12 are a plurality of baking trays 16 having spaced indentations 18. The indentations are loaded with sized pieces of dough 21 (see FIG. 3) from a dough supplying means generally designated 22. The sized dough pieces are guided from the dough-supplying means 22 towards the tray 16 by means of a guiding chute 20 disposed therebetween. An all purpose indexing means generally designated 25 is dispoed about and across the conveyor 10. The indexing means 25 further comprises a U-shaped indexing bar 24 having L-shaped end pieces 26, pivotally mounted to the convenyor frame 14 at pivot point 28. Two indexing fingers 30 are mounted in an indexing finger holder 32 and connected to the mid-portion of the indexing bar 24. As best shown in FIG. 3, air cylinders 34 are connected to lateral ends of the indexing bar 24. The air cylinders 34 are in turn connected through adjustment means generally designated 36 to the frame 14. The indexing bar 24 is reciprocated in a vertical direction at time intervals through air valving means 40 and hoses 38 which include a cam action (not shown).

Adjusting means 36 further comprises a cross-member or lever 42 pivotally mounted to the frame 14 having one end connected to air cylinder 34 and an opposite end connected to adjustment screw 44. Adjustment screw 44 is threaded into frame member 46 and is usable to adjust the lowest point of the indexing fingers as they approach the conveyor due to the action of valve means 40.

Figure 4:
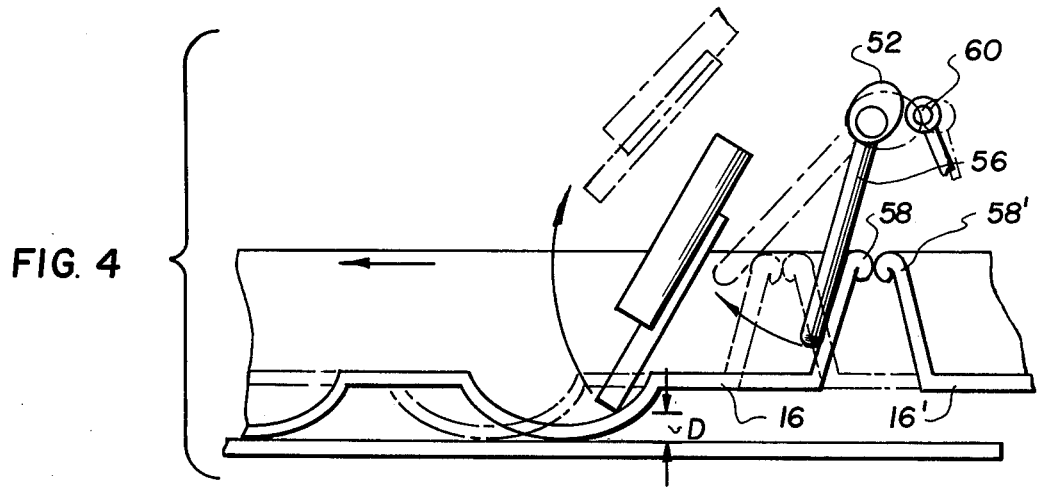
FIG. 4 is an enlarged detail view of the reciprocal motion of the indexing fingers and rotational motion of the sensing finger.

As best seen in FIG. 4, this adjustment will vary a depth D and reduce the possibility of lifting an opposite end of the baking pan due to a too-deep thrust of the indexing fingers 30 into the indentation 18 or any inequalities of the baking pans 16 causing improper indexing. The proper depth D is also needed to stop the pan it its proper loading position.

Figure 2:
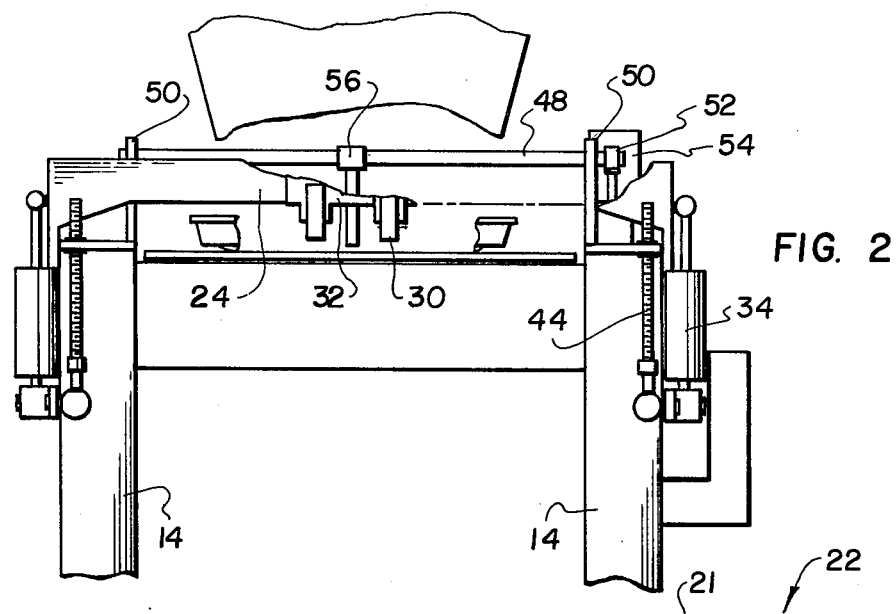
FIG. 2 is a sectional frontal elevation of the invention.

As best seen in FIGS. 1 and 2, a sensing rod 48 is pivotally mounted to frame portions 50 of frame 14. A cam 52 is provided adjacent one end of the sensing rod 48 and is adapted to actuate a microswitch 54 when the sensing rod 48 is rotated. A sensing finger 56 is connection adjacent the mid-portion of the sensing rod 48 and extends downwardly toward the conveyor.

As best shown in FIG. 4, the sensing rod is caused to rotate upwardly and away from the conveyor when a trailing edge 58 of a tray 16 passes the sensing finger 56. As the sensing rod 48 is rotated, the cam 52 actuates the flag 60 of the microswitch 54 and through a control means 62 changes the speed of the conveyor belt 12 from a first loading speed to a second faster tray-conveying speed. This higher speed is maintained until the leading edge 58' of a succeeding tray 16' on the conveyor 12 passes the sensing finger 56 and allows it to resume its initial downward position. In operation, this increase in speed enables the retention of the timing of valve means 40 without interrupting the smooth flow of trays 16 on the conveyor 12.

Figure 5:
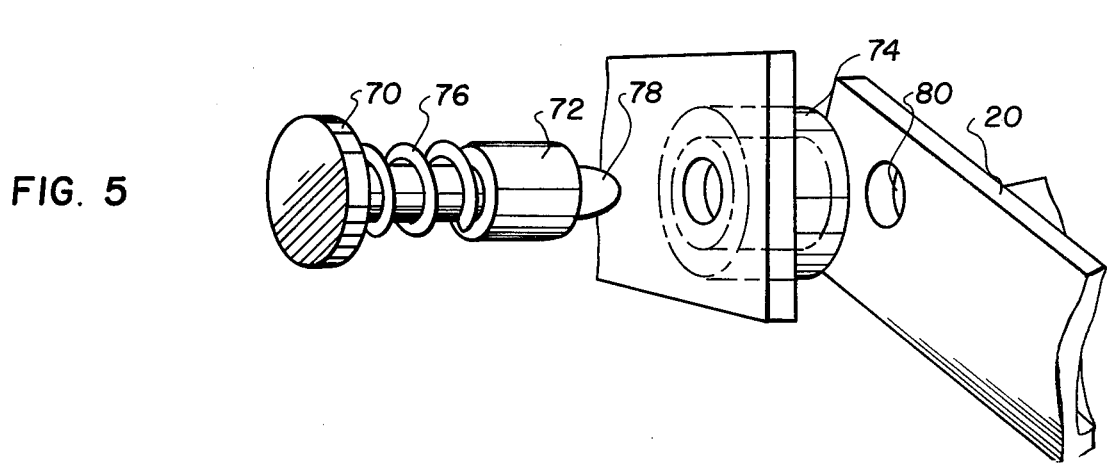
FIG. 5 is an exploded perspective view of the quick-disconnect element connected to the dough chute.

A quick disconnect means, generally designated 68 and best shown in FIG. 5, comprises a knurled hand-stem 70 having a flange portion 72 disposable in a barrel 74 and having spring 76 to urge pin 78 into hole 80 of the chute 20. In order to change chute 20 for a different loading operation, the knurled handstem 70 is pulled out and away from the chute 20, disengaging the pin 78 from the hole 80 and allowing removal of the chute.

Figure 6:
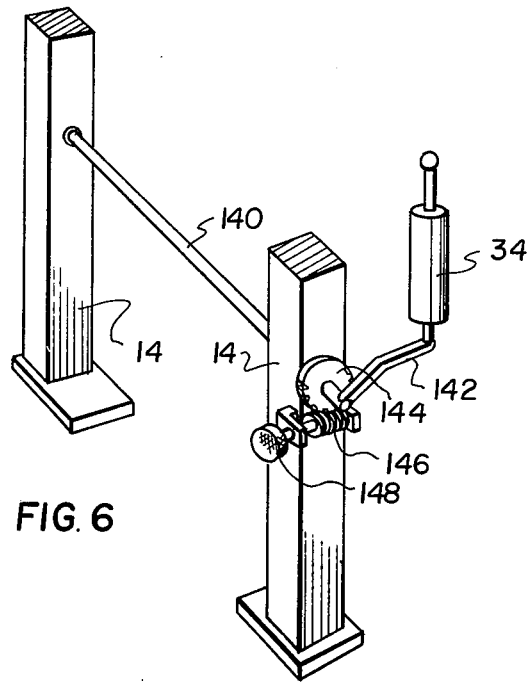
FIG. 6 is a perspective partial view of another embodiment of the adjustment means above.
Figure 7:
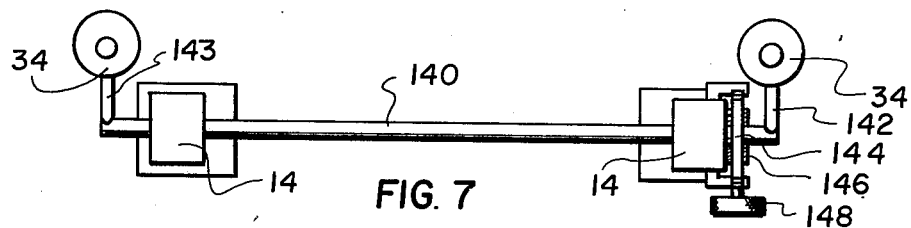
FIG. 7 is a plane view of the means of FIG. 6.

FIGS. 6 and 7 show an alternative form for the depth adjustment means. In this embodiment, an adjustment shaft 140 is rotatably mounted in bearings on legs 14', 14', across the conveyor frame. An adjustment gear 144 is connected to one end of the shaft and engages a worm gear 146 which is mounted in one leg 14' of the conveyor frame. Adjustment arms 142, 143 are connected to the cylinders 34, 34 from the shaft 140. An adjustment operation is accomplished by turning handwheel 148 which rotates worm gear 146 and shaft 140 through adjustment gear 144. Arms 142, 143 then move cylinders 34, 34 to the desired positions.

Figure 8:
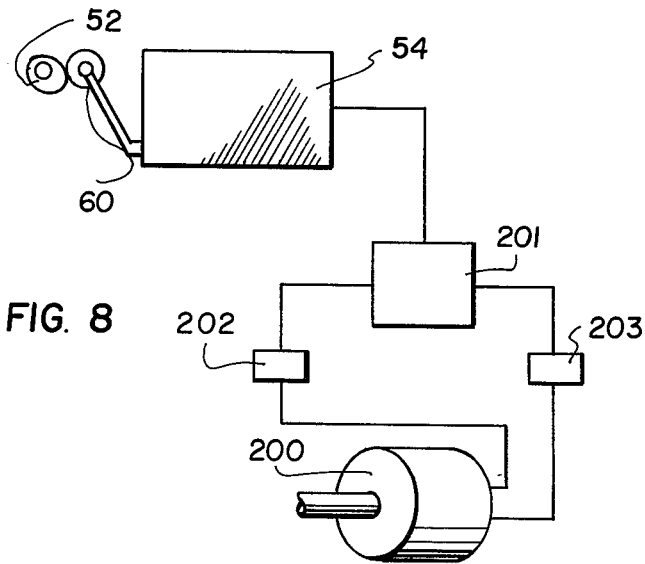
FIG. 8 is a schematic view of the electrical connection of the conveyor motor means.

FIG. 8 shows the switching circuit for a conveyor motor 200. Microswitch 54 is connected to relay 201 which is normally connected through potentiometer 202 for slow or constant speed of conveyor motor 200. When flag 60 of microswitch 54 is pushed by cam 52 due to a sensing finger movement, the relay 201 switches to potentiometer 203 and high speed or convenying speed of motor 200 to advance the pans for further further indexing.

What is claimed is:

1. An all purpose indexing device for use with a conveyor having a moving conveyor belt and a fixed frame, and for interrupting the motion of baking pans having space rows of dough-receiving indentations on the conveyor belt comprising:

an indexing bar means disposed across a conveyor belt pivotally mounted to the frame;
   indexing finger means adjacent the mid-portion of said indexing bar means for engaging the indentations of the baking pans when said indexing bar is pivoted downwardly toward the conveyor belt;
   reciprocating means connected between said indexing bar means and the conveyor frame adjacent lateral ends of said indexing bar means for reciprocally moving said indexing bar means from an upper position whereby said indexing finger means are clear of the baking trays and downwardly to a position at which said indexing finger means are in engagement with the indentations of the baking pans;
   sensing means disposed across the conveyor for sensing the passage of a leading and trailing edge of the baking pans on the conveyor; and
   switching means engagable with said sensing means for varying the speed of the conveyor belt from a first slower feed speed to a second faster, tray-conveying speed.

2. A device according to claim 1 wherein said sensing means further comprises a sensing rod pivotally mounted to the frame, a sensing finger connected to said sensing rod and extending downwardly toward the conveyor belt, and cam means connected to said sensing rod engagable with said switching means for varying the speed from the slower feed speed when said sensing finger is extended down toward the conveyor belt and varying the speed to the faster tray-conveying speed when said finger is displaced upwardly due to the passing of an edge of the baking pans.

3. An all purpose indexing device for use with a conveyor having a moving belt and an adjustable frame, and for interrupting the motion of baking pans, having spaced rows of dough-receiving indentations on the belt, comprising:

An indexing bar disposed across the belt and pivotally mounted to said adjustable frame,
   Indexing fingers connected to said bar and extending downwardly toward the belt, reciprocating air cylinders connected between said bar and the frame;
   Adjustment means connected between said cylinders and the frame;
   Sensing finger means pivotally mounted to the frame and disposed across the belt, and
   Switching means connected to said sensing finger means for changing the speed of the belt.

4. An all purpose indexing device for use with a conveyor having a moving conveyor belt and a fixed frame, and for interrupting the motion of baking pans having space rows of dough-receiving indentations on the conveyor belt comprising:

an indexing bar means disposed across a conveyor belt pivotally mounted to the frame;
   indexing finger means adjacent the mid-portion of said indexing bar means for engaging the indentations of the baking pans when said indexing bar is pivoted downwardly toward the conveyor belt;
   reciprocating means connected between said indexing bar means and the conveyor frame adjacent lateral ends of said indexing bar means for reciprocally moving said indexing bar means from an upper position whereby said indexing finger means are clear of the baking trays and downwardly to a position at which said indexing finger means are in engagement with the indentations of the baking pans;
   adjustment means connected between said reciprocating means and the conveyor frame for adjusting the extremes of said indexing bar means positions; and
   wherein said adjusting means further comprises a cross-member pivotally mounted to a fixed portion of the frame connected at one end to said reciprocating means and at the other end to a screw adjustment, said screw adjustment being engaged through the conveyor frame.

5. An all purpose indexing device for use with a conveyor having a moving conveyor belt and a fixed frame, and for interrupting the motion of baking pans having space rows of dough-receiving indentations on the conveyor belt comprising:

an indexing bar means disposed across a conveyor belt pivotally mounted to the frame;
   indexing finger means adjacent the mid-portion of said indexing bar means for engaging the indentations of the baking pans when said indexing bar is pivoted downwardly toward the conveyor belt;
   reciprocating means connected between said indexing bar means and the conveyor frame adjacent lateral ends of said indexing bar means for reciprocally moving said indexing bar means from an upper position whereby said indexing finger means are clear of the baking trays and downwardly to a position at which said indexing finger means are in engagement with the indentations of the baking pans;
   adjustment means connected between said reciprocating means and the conveyor frame for adjusting the extremes of said indexing bar means positions; and wherein said adjustment means further comprises an adjustment shaft rotatably mounted across the conveyor frame, adjustment arms connected to said shaft and engagable with said reciprocating means, an adjustment gear connected to said shaft and a worm gear engaged with said adjustment gear to rotate said shaft and said reciprocating means through said adjustment arms.

* * * * *